United States Patent
Lee et al.

(10) Patent No.: US 7,590,091 B2
(45) Date of Patent: *Sep. 15, 2009

(54) METHOD AND SYSTEM FOR SWITCHING OVER TO 1X SYSTEM UPON 1XEV-DO SYSTEM FAILURE

(75) Inventors: Jaemoon Lee, Songpa-gu (KR); Jintae Choi, Dongjak-gu (KR); Beyongsu Kim, Youngsan-gu (KR); Namgyu Kim, Uiwang-si (KR)

(73) Assignee: SK Telecom Co., Ltd., Seoul (KR)

( * ) Notice: Subject to any disclaimer, the term of this patent is extended or adjusted under 35 U.S.C. 154(b) by 225 days.

This patent is subject to a terminal disclaimer.

(21) Appl. No.: 10/541,251

(22) PCT Filed: Dec. 12, 2003

(86) PCT No.: PCT/KR03/02719

§ 371 (c)(1),
(2), (4) Date: Jun. 22, 2006

(87) PCT Pub. No.: WO2004/059856

PCT Pub. Date: Jul. 15, 2004

(65) Prior Publication Data

US 2006/0246950 A1    Nov. 2, 2006

(30) Foreign Application Priority Data

Dec. 30, 2002  (KR) ............... 10-2002-0087433
Aug. 4, 2003   (KR) ............... 10-2003-0053894

(51) Int. Cl.
    *H04Q 7/00*    (2006.01)
(52) U.S. Cl. ................ 370/331; 370/328; 370/355
(58) Field of Classification Search ... 455/426.1–426.2, 455/436–444, 552.1, 553.1, 434, 452.2, 560–562; 370/331–337, 328, 342, 352–354, 355
See application file for complete search history.

(56) References Cited

U.S. PATENT DOCUMENTS

| | | | |
|---|---|---|---|
| 5,412,686 A * | 5/1995 | Ling | 375/147 |
| 6,125,283 A * | 9/2000 | Kolev et al. | 455/552.1 |
| 6,360,109 B1 * | 3/2002 | Thauvin et al. | 455/564 |
| 6,842,619 B2 * | 1/2005 | Lee et al. | 455/453 |
| 7,068,669 B2 * | 6/2006 | Abrol et al. | 370/401 |

FOREIGN PATENT DOCUMENTS

| | | |
|---|---|---|
| JP | 10-108245 | 4/1998 |
| JP | 10-173592 | 6/1998 |
| JP | 10-257102 | 9/1998 |
| JP | 2002-247035 | 8/2002 |
| JP | 2002-345019 | 11/2002 |
| WO | WO-02/47399 A3 | 6/2002 |

* cited by examiner

*Primary Examiner*—Lester Kincaid
*Assistant Examiner*—Sayed T Zewari
(74) *Attorney, Agent, or Firm*—Lowe Hauptman Ham & Berner, LLP (57) ABSTRACT

The present invention relates to a method and system for switching over a call connection of a hybrid access terminal to a 1X system if a 1XEV-DO system has a problem when the hybrid access terminal requests a call connection to the 1xEV-DO system. The system in accordance with the present invention includes the hybrid access terminal, a 1X transceiver subsystem, a 1X controller, a mobile switching center, an access network transceiver subsystem, an access network controller, a packet data serving node and an IP network.

25 Claims, 5 Drawing Sheets

METHOD AND SYSTEM FOR SWITCHING OVER TO 1X SYSTEM UPON 1XEV-DO SYSTEM FAILURE

FIELD OF THE INVENTION

The present invention relates to a method and a system for switching a call connection to a CDMA 2000 1X system when a malfunction occurs in a CDMA 2000 1xEV-DO system, and more particularly to a method and a system for switching a call connection to a CDMA 2000 1X system if a malfunction occurs in the CDMA 2000 1xEV-DO system to perform the call connection when a hybrid access terminal requests the call connection to the CDMA 2000 1xEV-DO system.

DESCRIPTION OF THE PRIOR ART

Mobile communication systems have been greatly advanced through $1^{st}$ generation analog-type advanced mobile phone systems (AMPS) and $2^{nd}$ generation cellular/personal communication service (PCS) systems. Recently, international mobile telecommunication-2000 (IMT-2000) systems have been developed and are widely used for $3^{rd}$ generation high-rate data communication systems.

IMT-2000 services may be classified into a CDMA (Code Division Multiple Access) 2000 1X service and a CDMA 2000 1xEV-DO service.

The CDMA 2000 1X service is a service capable of performing wireless internet communication with a maximum speed of 144 kbps, which is much faster than a speed of 14.4 kbps and 57 kbps supported in the conventional IS-95A and IS-95B networks, by using an IS-95C network advanced from the conventional IS-95A and IS-95B networks. Therefore, through the CDMA 2000 1X service, it is possible not only to improve qualities of the conventional voice and WAP (Wireless Application Protocol) services, but also to provide various multimedia services, such as AOD, VOD, etc.

Meanwhile, the 3GPP2 ($3^{rd}$ Generation Partnership Project 2), which is a collaborative international standardization group, offers standards of a CDMA IMT-2000 system as IMT-2000 standards in order to provide multimedia mobile communication services. According to the above standards, a high rate packet data system called "CDMA 2000 1xEV-DO (Evolution Data Optimized)" based on an HDR (high data rate) proposed by Qualcom Incorporated, has been decided upon as an international standard high rate packet data system. The CDMA 2000 1xEV-DO (hereinafter, referred to as "1xEV-DO") has been upgraded from a communication standard for a CDMA 2000 1X (hereinafter, referred to as "1X") and is designed to transmit only data.

The 1X utilizes both circuit networks and packet networks and provides one-way high-rate data services with a maximum transmission rate of 307.2 kbps. In contrast, the 1xEV-DO is dedicated for a packet network and provides two-way high-rate data services with a maximum transmission rate of 2.4 Mbps.

In the following description, the CDMA 2000 1X system is simply referred to as "1X system" and the CDMA 2000 1xEV-DO system is simply referred to as "1xEV-DO system" for the convenience of explanation.

Currently, the 1xEV-DO system has been used together with the conventional 1X system. That is, both of the 1xEV-DO system and the conventional 1X system are installed in one wireless base station or a base station controller even though they are operated separately from each other. In other words, a transceiver of the wireless base station includes a channel card for the 1xEV-DO system and a channel card for the 1X system, respectively. In addition, the base station controller includes a data processing board for processing packet data transmitted through the 1xEV-DO system and a data processing board for processing data transmitted through the 1X system, respectively.

Multimedia data are transmitted to a mobile terminal from a mobile communication system, such as the wireless base station or the base station controller, through the 1xEV-DO system. In addition, voice signals or data are transmitted to the mobile terminal through the 1X system.

Meanwhile, when a user wants to receive data to a mobile terminal from the 1xEV-DO system, a call connection is requested to the 1xEV-DO system. Then, the 1xEV-DO system a frequency signal to the mobile terminal having requested call connection in order to establish a plurality of channels, such as a pilot, a traffic channel, an access channel, etc. However, in a case in which an error is generated in the 1xEV-DO system due to an internal problem, the 1xEV-DO system cannot assign a frequency signal to the mobile terminal having requested a call connection.

Therefore, the mobile terminal having requested a call connection fails in making a call connection to the 1xEV-DO system, and displays a call connection failure. Accordingly, there is a troublesome problem in that the user must retry a call connection to the 1xEV-DO system from the beginning in order to receive multimedia data. Also, even though retrying a call connection, the user will not be able to avoid a failed call connection again as long as the 1xEV-DO system does not recover.

SUMMARY OF THE INVENTION

Therefore, the present invention has been made in view of the above-mentioned problems, and it is an object of the present invention to provide a method and a system for switching a call connection to a CDMA 2000 1X system if a CDMA 2000 1xEV-DO system malfunctions when a hybrid access terminal requests the call connection to the CDMA 2000 1xEV-DO system, thereby switching a call connection to the 1X system when the 1xEV-DO system performing the call connection malfunctions.

In order to accomplish the above object, according to a first aspect of the present invention, there is provided a hybrid mobile communication system for switching a call connection to a CDMA 2000 1X system when a malfunction occurs in a CDMA 2000 1xEV-DO system, the hybrid mobile communication system comprising: a hybrid access terminal operated in a 1X mode in relation to a 1X system for receiving a voice signal transmission service or a low-rate data transmission service from the 1X system and in a 1xEV-DO mode in relation to the 1xEV-DO system for receiving a high-rate data transmission service from the 1xEV-DO system, in which the hybrid access terminal trying a call connection to the 1xEV-DO mode in order to receive the high-rate data transmission service is switched to the 1X mode when receiving a connection deny message from the 1xEV-DO system, thereby carrying out the call connection to the 1X system and receiving the high-rate data transmission service through the 1X system; a 1xEV-DO access network transceiver subsystem for providing the high-rate data transmission service to the hybrid access terminal through an air interface; a 1X transceiver for providing the voice signal transmission service or the low-rate data transmission service to the hybrid access terminal; a 1xEV-DO access network controller for controlling the high-rate data transmission service of the 1xEV-DO access network transceiver subsystem; a 1X controller for controlling the voice signal transmission service or the low-rate data transmission service of the 1X transceiver; a mobile switching center for providing a communication access path by switching to the 1X system in response to a communication call transmitted from the hybrid access terminal; and a packet data serving node (PDSN) for transmitting/receiving high-rate data to/from the 1xEV-DO system in a form of an internet protocol (IP) packet.

According to a second aspect of the present invention, there is provided a method for switching a call connection to a CDMA 2000 1X system when a malfunction occurs in a CDMA 2000 1xEV-DO system, the method comprising the steps of: (a) initializing a 1X mode for making communication with the 1X system and a 1xEV-DO mode for making communication with the 1xEV-DO system and staying in an idle state; (b) performing dual monitoring with respect to the 1X mode and the 1xEV-DO mode; (c) causing the 1xEV-DO mode to enter an active state so as to transmit/receive multimedia data; (d) transmitting a connection request message to the 1xEV-DO system, thereby requesting a call connection; (e) judging whether or not a connection deny message is received from the 1xEV-DO system; (f) stopping an operation of the 1xEV-DO system when the connection deny message is received, and causing the 1X mode to enter an active state by switching hybrid access terminal into the 1X mode; and (g) transmitting/receiving data by carrying out the call connection with the 1X system.

According to a third aspect of the present invention, there is provided a hybrid access terminal for switching a call connection to a CDMA 2000 1X system when a malfunction occurs in a CDMA 2000 1xEV-DO system, wherein, the hybrid access terminal is operated in a 1X mode in relation to a 1X system for receiving a voice signal transmission service or a low-rate data transmission service from the 1X system and in a 1xEV-DO mode in relation to the 1xEV-DO system for receiving a high-rate data transmission service from the 1xEV-DO system, and the hybrid access terminal trying a call connection to the 1xEV-DO mode in order to receive the high-rate data transmission service is switched to the 1X mode when receiving a connection deny message from the 1xEV-DO system, thereby carrying out the call connection to the 1X system and receiving the high-rate data transmission service through the 1X system.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE INVENTION

Reference will now be made in detail to the preferred embodiments of the present invention. It is to be noted that the same elements are indicated with the same reference numerals throughout the drawings. Also, in the following description of the present invention, a detailed description of known functions and configurations incorporated herein will be omitted when it may make the subject matter of the present invention rather unclear.

Figure 1:
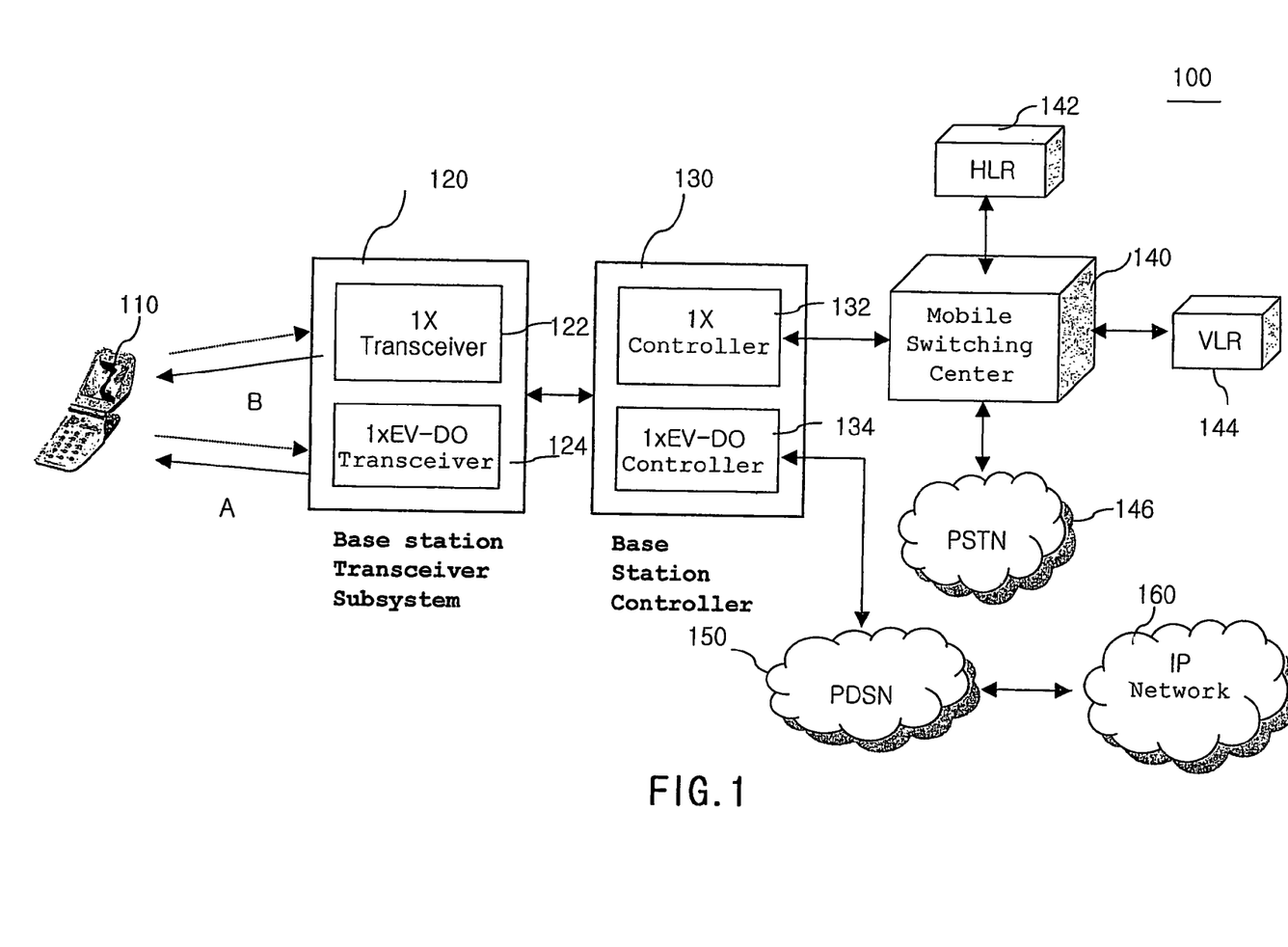
FIG. 1 is a schematic block view of a system for explaining switchover of a call connection to a 1X system when a 1xEV-DO system malfunctions according to an exemplary embodiment of the present invention.

FIG. 1 is a schematic block view showing a construction of a hybrid mobile communication system where a call connection is switched between a 1xEV-DO system and a 1X system according to an exemplary embodiment of the present invention.

As shown in FIG. 1, the hybrid mobile communication system 100 of the present invention includes both 1xEV-DO system and 1X system. That is, the hybrid mobile communication system 100 has a construction including a hybrid access terminal 110 and consisting of a 1X transceiver 122, a 1X controller 132, and a mobile switching center (MSC) 140 in order to transmit a voice signal and low-rate data. In addition, the hybrid mobile communication system 100 has another construction including the hybrid access terminal 110 and consisting of a 1xEV-DO access network transceiver subsystem (ANTS) 124, a 1xEV-DO access network controller (ANC) 134, a packet data serving node (hereinafter, simply referred to as PDSN) 150, and an IP (internet protocol) network 160 in order to transmit multimedia data.

The hybrid access terminal 110 is a mobile communication terminal capable of receiving all communication services provided from each of the 1xEV-DO system and the 1X system. The hybrid access terminal 110 periodically and alternatively monitors both systems at a predetermined period of time. That is, the hybrid access terminal 110 periodically searches the 1xEV-DO system while the hybrid access terminal 110 is communicating with the 1X system, where the 1xEV-DO system is not operated. Also, the hybrid access terminal 110 periodically searches the 1X system while the hybrid access terminal is in traffic with the 1xEV-DO system.

For example, the hybrid access terminal 100 in traffic with the 1xEV-DO system periodically accesses to the 1X system and updates system resources, such as system messages and access messages, in order to respond to call signals, such as voice call-accepted signals and short messages, which may be transmitted to the hybrid access terminal 110 from the 1X system. Therefore, for the purpose of enabling the hybrid access terminal 110 to receive a voice signal transmission service and a low-rate data transmission service from the 1X system and to receive a high-rate data service from the 1xEV-DO system, separately, the hybrid access terminal 110 includes two constructions corresponding to both systems, so as to allow the hybrid access terminal 110 to communicate with both systems. The two constructions operate independently from each other. The hybrid access terminal 110, having such combined functions and constructions, is generally switched to a 1X mode when the hybrid access terminal 110 is in an idle state in such a manner that the hybrid access terminal 110 can make communication with the 1X system. In this state, the hybrid access terminal 110 is periodically switched to a 1xEV-DO mode at a predetermined period of time so as to check whether or not data are received through the 1xEV-DO system, and returns to the 1X mode.

The switching functions operating between the 1xEV-DO system and the 1X system are controlled by means of software stored in a mobile station modem (MSM) chip, which is a kind of a baseband modem chip accommodated in the hybrid access terminal 110. In addition, the switching functions are achieved by tracking frequencies of both systems using a searcher connected to the MSM chip. That is, when the hybrid access terminal 110 switches from the 1xEV-DO mode into the 1X mode, a searcher module tracks the frequency of the 1X system under the control of the MSM chip. In addition, when the hybrid access terminal 110 switches from the 1X mode into the 1xEV-DO mode, the searcher module tracks the frequency of the 1xEV-DO system.

In the 1xEV-DO mode, in a case of a forward link for transmitting multimedia data from the 1xEV-DO system to the hybrid access terminal 110 through an access network (AN), a TDMA method (time division multiple access) is used to transmit a great amount of messages. On the other hand, in the 1xEV-DO mode, in a case of a reverse link for transmitting data from the hybrid access terminal 110 to the 1xEV-DO system through an access network (AN), a CDMA (time division multiple access) method is used to accommodate a plurality of subscribers.

In addition, the hybrid access terminal 110 receiving data from the 1xEV-DO system with the 1xEV-DO mode is periodically switched to the 1X mode at a predetermined period of time so as to check whether or not voice signals are received through the 1X mode and returns to the 1xEV-DO mode.

In the 1xEV-DO mode, when attempting to access to the 1xEV-DO access network transceiver subsystem 124 so as to receive multimedia data from the 1xEV-DO system, if the hybrid access terminal 110 receives a connection deny message from the 1xEV-DO access network transceiver subsystem 124 depending on malfunction of the 1xEV-DO access network transceiver subsystem 124 or the 1xEV-DO access network controller 134, the hybrid access terminal 110 determines that the 1xEV-DO system has failed and switches from the 1xEV-DO mode into the 1X mode to perform a call connection to the 1X system, thereby receiving the multimedia data from the 1X system.

The 1X transceiver 122 and the 1xEV-DO access network transceiver subsystem 124 form a base station transceiver subsystem (BTS) 120 so as to provide mobile communication services including voice signals and multimedia data to the hybrid access terminal 110 through an air interface. For example, the 1X transceiver 122 transmits voice or low-rate data to the hybrid access terminal 110, and the 1xEV-DO access network transceiver subsystem 124 mainly transmits only high-rate data to the hybrid access terminal 110.

The 1X controller 132 and the 1xEV-DO access network controller 134 form a base station controller (BSC) 130 for controlling a mobile communication service of the base station transceiver subsystem 120. That is, the 1X controller 132 connects a plurality of 1X transceivers to the mobile switching center 140 in order to control transmission of voice or data, and the 1xEV-DO access network controller 134 connects a plurality of 1xEV-DO access network transceiver subsystems to the PDSN 150, which is a packet data network, in order to control transmission of data.

Particularly, when the hybrid access terminal 110 requests a call connection for transmitting multimedia data, if failing in making a call connection with the hybrid access terminal 110 because of malfunction of the 1xEV-DO access network transceiver subsystem 124 or the 1xEV-DO access network controller 134, the 1xEV-DO access network controller 134 transmits a connection deny message to the hybrid access terminal 110 so that the hybrid access terminal 110 may stop the call connection to the 1xEV-DO system and perform a call connection to the 1X system.

The mobile switching center 140 physically connects a plurality of 1X controllers 132 to another mobile switching center or to a public switched telephone network (hereinafter, simply referred to as "PSTN") 146, and provides a communication access route of the 1X system by switching the communication access route when a call connection is requested from the hybrid access terminal 110.

In addition, the mobile switching center 140 processes call signals of subscribers by obtaining information of the hybrid access terminal from a home location register (hereinafter, simply referred to as "HLR") 132, which is a database storing information of hybrid access terminals registered in the mobile switching center 140, and a visitor location register (hereinafter, simply referred to as "VLR") 134, which is a database storing information of hybrid access terminals 110 located in a service region of the mobile switching center 140.

The 1xEV-DO system, which is a packet data system for transmitting only data, is connected to the PDSN 150 based on TCP/IP, so as to transmit/receive various data in the form of IP packets to/from the IP network 160. In addition, the 1xEV-DO system receives packet data transmitted from the IP network 160 to the hybrid access terminal 110, creates a MPEG packet or the like for a packet data service on the basis of the received packet data, and transmits the created packet data to the hybrid access terminal 110 through time slots, which are divided through a TDM method. Also, the 1xEV-DO system receives data, which are modulated through a CDMA method, from the hybrid access terminal 110, creates IP packet on the basis of the received data, and transmits the created IP packet to the PDSN 150.

The 1xEV-DO system must maximize a throughput in each sector and allot high-rate transmission to each user as possible depending on channel conditions. Therefore, when transmitting multimedia data to one hybrid access terminal 110 located in one sector, the 1xEV-DO system provides a multimedia service to the hybrid access terminal 110 with a maximum power.

In the 1xEV-DO system, in a case of a forward link, the base station transmits multimedia data with maximum power thereof without a power and can provide hard handoff. In a case of a reverse link, the power control is carried out in each hybrid access terminal and can provide softer or soft handoff.

Figure 2A:
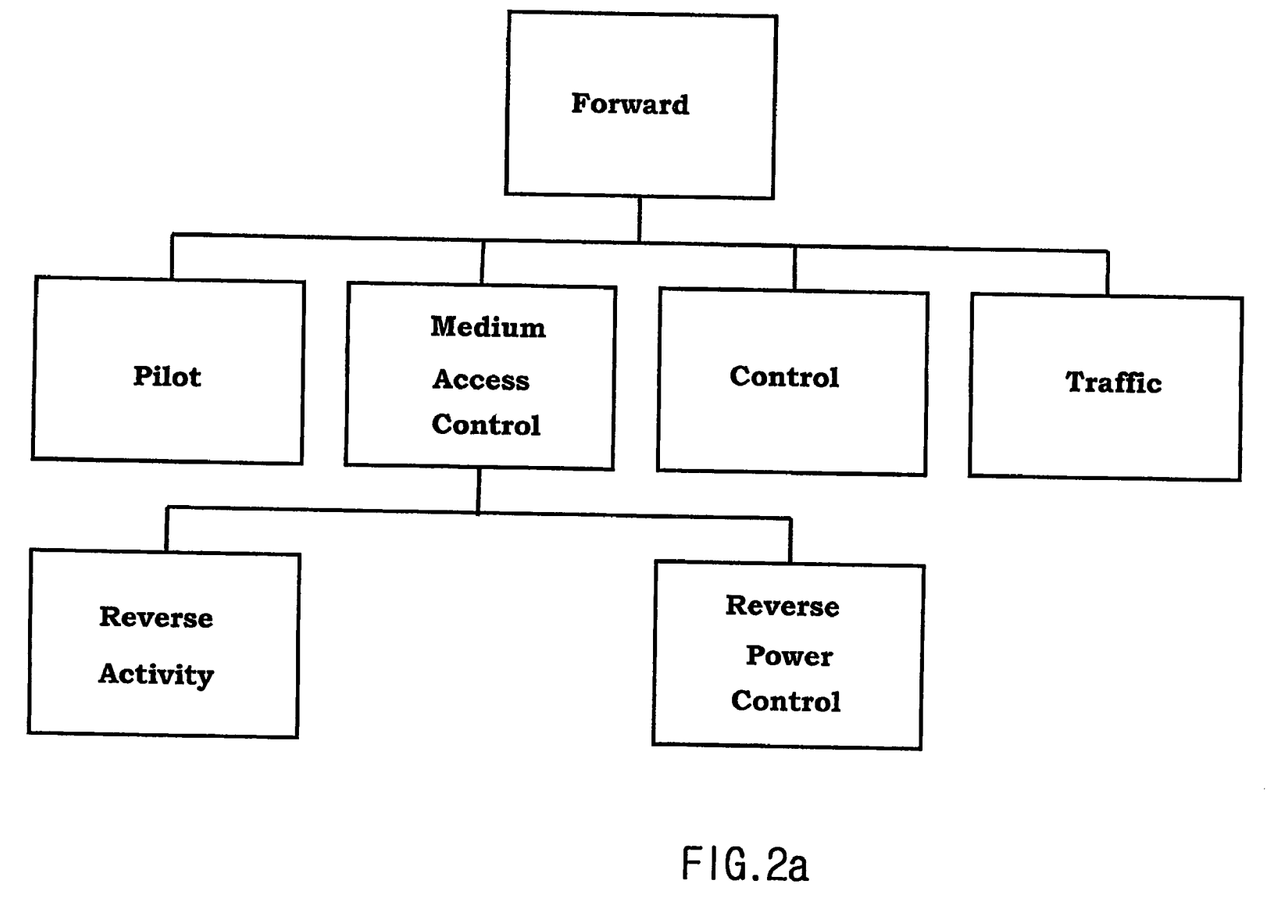
FIG. 2A is a block view showing a channel structure of a forward link for transmission from a 1xEV-DO access network transceiver subsystem to a hybrid access terminal.

FIG. 2A is a block view showing a channel structure of a forward link for transmission from a 1xEV-DO access network transceiver subsystem to a hybrid access terminal.

As shown in FIG. 2A, the forward link includes a pilot channel, a medium access control (MAC) channel, a control channel, and a traffic channel. The pilot channel is provided to transmit a pilot signal for allowing the 1xEV-DO system to track the hybrid access terminal 110. The hybrid access terminal 110 receives at least one pilot signal through the pilot channel and accesses to a wireless base station, which has transmitted a pilot signal having greatest signal intensity. In addition, the pilot channel is used as a reference for coherent detection of the wireless base station having the 1xEV-DO system by means of the hybrid access terminal 110.

The MAC channel is mainly used for controlling the reverse link and includes a reverse activity (RA) channel and a reverse power control (RPC) channel. Herein, the RA channel is used for determining a transmission rate of the reverse link. In addition, the RA channel may be used for requesting the hybrid access terminal 110 to decrease the transmission rate when channels of the reverse link are saturated. In addition, the RPC channel is used for controlling transmission power when the hybrid access terminal 110 transmits signals or data through the reverse link.

The control channel is used for transmitting a broadcast message or a direct message for directly controlling a specific hybrid access terminal from the 1xEV-DO system to the hybrid access terminal 110. The traffic channel is used when the 1xEV-DO system transmits only packet data to the hybrid access terminal 110.

Figure 2B:
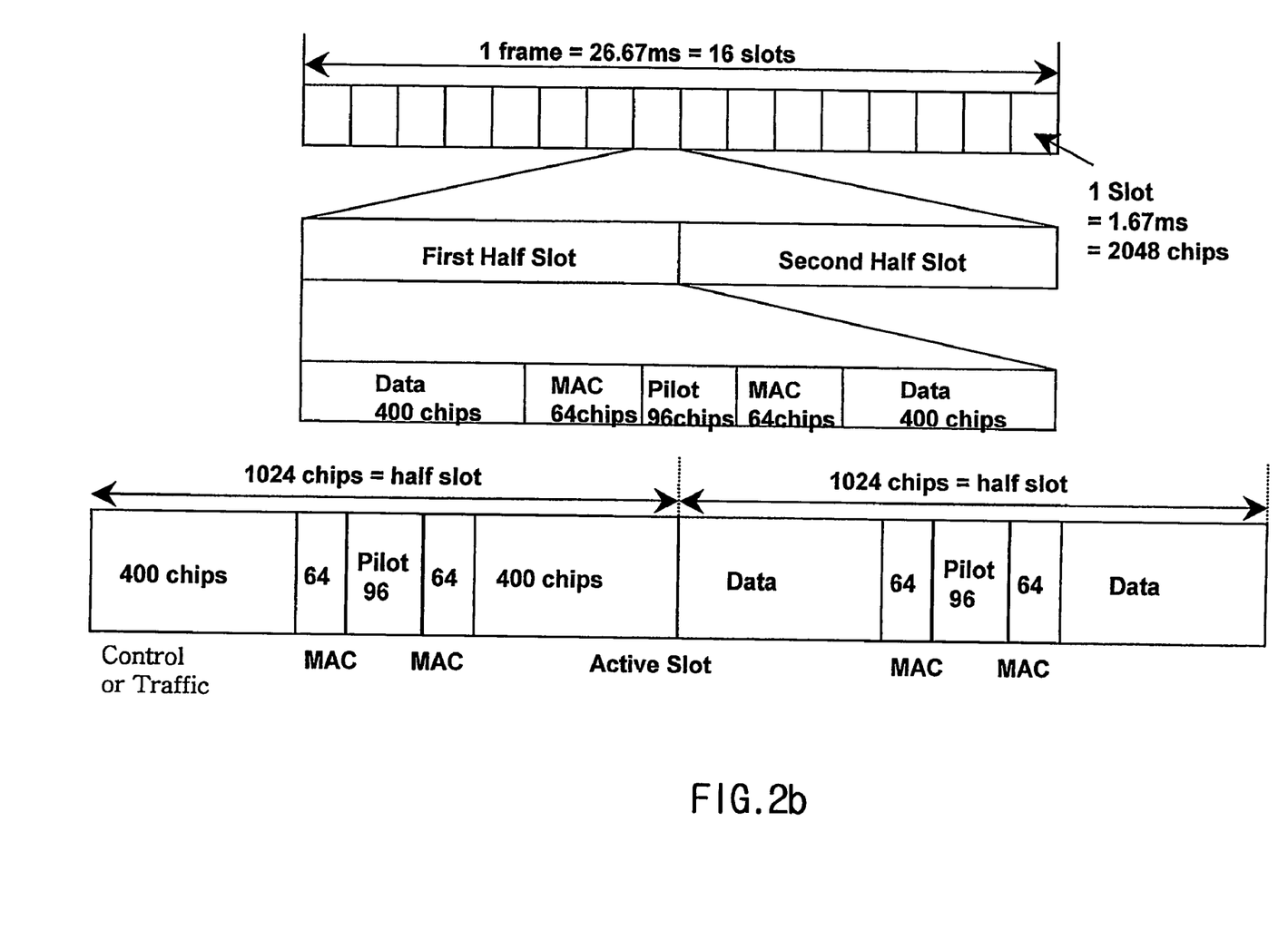
FIG. 2B is a block view showing a time slot structure and a data structure of a forward link for transmission from 1xEV-DO access network transceiver subsystem to a hybrid access terminal.

Hereinafter, a time slot structure and a data structure in the forward link will be described with reference to FIG. 2B. Firstly, the forward link includes 16 time slots per one frame having a time interval of about 26.67 ms. In addition, each of the time slots includes a first half slot having 1024 chips and a second half slot having 1024 chips, that is, the time slot has total 2048 chips. In addition, a time interval of 1.67 ms is allotted to each time slot.

In detail, each of the first half slot and second half slot includes 400 data slot chips, 64 MAC slot chips, 96 pilot slot chips, 64 MAC slot chips and 400 data slot chips.

Figure 3:
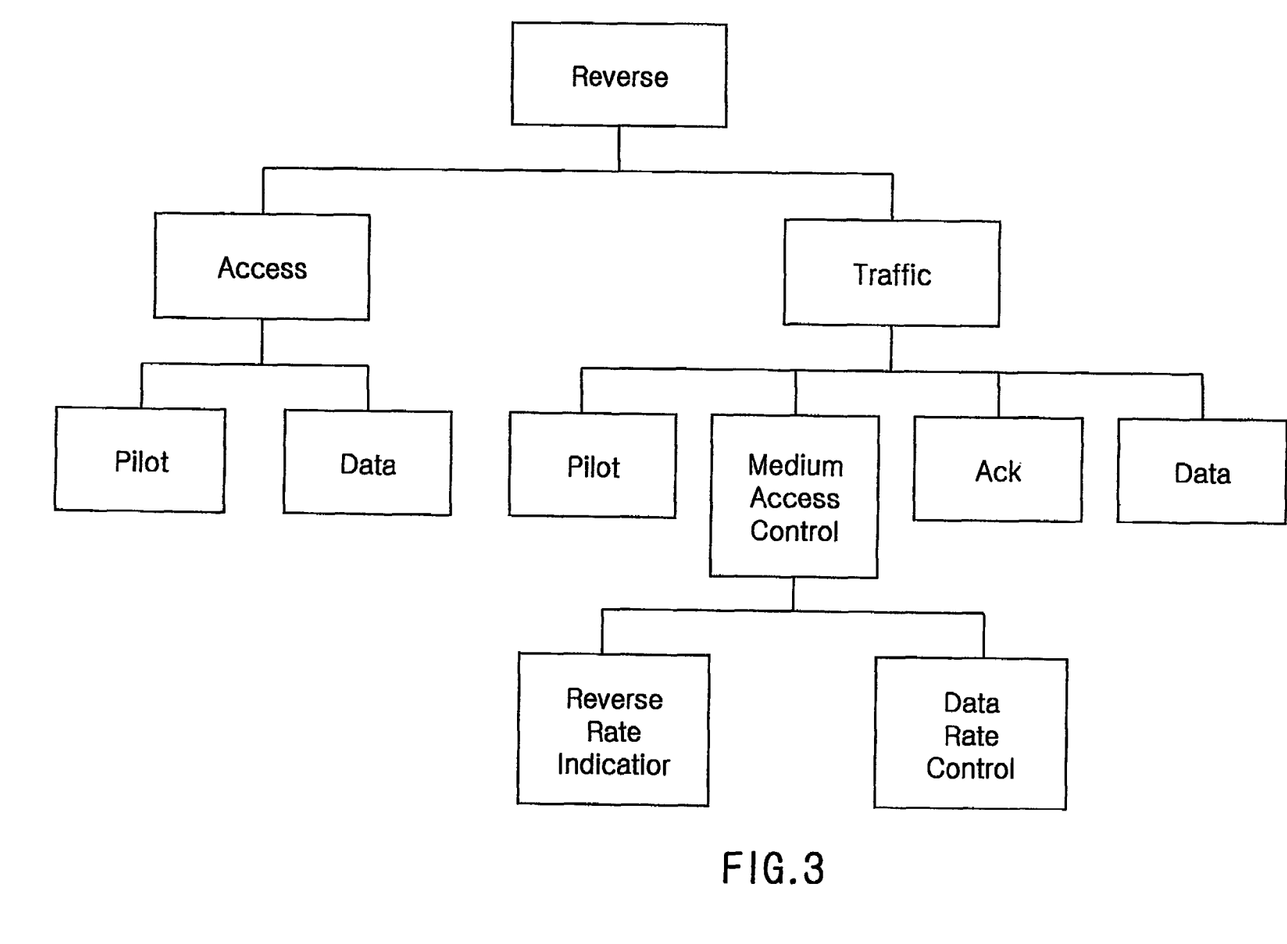
FIG. 3 is a block view showing a channel structure of a reverse link for transmission from a hybrid access terminal to a 1xEV-DO access network transceiver subsystem.

FIG. 3 is a block view showing a channel structure of a reverse link for transmission from a hybrid access terminal to a 1xEV-DO access network transceiver subsystem The reverse link shown in FIG. 3 may use a CDMA method in the same manner as the 1X system and mainly include an access channel and a traffic channel. The access channel has a pilot channel and a data channel and the traffic channel has a pilot channel, a MAC channel, an Ack channel, and a data channel. Herein, the MAC channel is again divided into a reverse rate indicator (RRI) channel and a data rate control (DRC) channel.

The access channel is used for transmitting an origination signal (connection_request message) and a registration signal (route_update message). The access channel has a low transmission rate of 9.6 kbps for stability of a wireless channel.

Similar to the pilot channel in the forward link shown in FIG. 2A, the pilot channel shown in FIG. 3 is used as a reference when the hybrid access terminal 110 performs coherent detection of the wireless base station of the 1xEV-DO system. The data channel is used for transmitting data required for the hybrid access terminal 110 to access to the 1xEV-DO system.

The traffic channel is used when the hybrid access terminal 110 transmits packet data to the 1xEV-DO system. The traffic channel provides various data transmission rates depending on the wireless communication environment.

The pilot channel performs a function identical to the function of the pilot channel, which has been described with reference to the access channel. The MAC channel is used for controlling a data transmission rate of the traffic channel, so the MAC channel continuously exists while the hybrid access terminal 110 is being connected to the 1xEV-DO system. The RRI channel of the MAC channel is used for representing information of the data transmission rate of the traffic channel when the hybrid access terminal 110 transmits data through the traffic channel. An RRI value is displayed in the hybrid access terminal 110.

In addition, the DRC channel determines a data rate, which can be demodulated, depending on the channel environment of the forward link and notifies the base station of the data rate. That is, the 1xEV-DO access network transceiver subsystem 124 transmits packet data to the hybrid access terminal 110 by using time slots of the forward link. At this time, a basis for determining the transmission rate of packet data is the DRC cover value transmitted by the hybrid access terminal 110. In order to determine the DRC cover value, the hybrid access terminal 110 measures a C/I (carrier to interference) value transmitted from the 1xEV-DO access network transceiver subsystem 124 and determines the DCR cover value for the maximum transmission rate.

The Ack channel is used for transmitting an acknowledgment signal of data, which are received in the hybrid access terminal 110 in a forward direction in a time slot unit. The Ack channel is adaptable for data having a short length and corresponding to a half of the length of a base time slot in order to reduce interference.

Similar to the data channel of the access channel, the data channel of the traffic channel is used when the hybrid access terminal 110 transmits only packet data.

Meanwhile, packet, which is a basic transmission unit of the traffic channel, has a length of 26.66 ms, and is transmitted with a bit transmission rate changed depending on a size of the packet. The pilot channel, the traffic channel, the DRC channel and the Ack channel, which are used in the reverse link, are distinguished by using Walsh code, which is an orthogonal code.

Hereinafter, with reference to the construction of the above-mentioned system and a flowchart shown in FIG. 4, an operation for switching over a call connection to a 1X system when the 1xEV-DO system malfunctions will be described according to an embodiment of the present invention.

Figure 4:
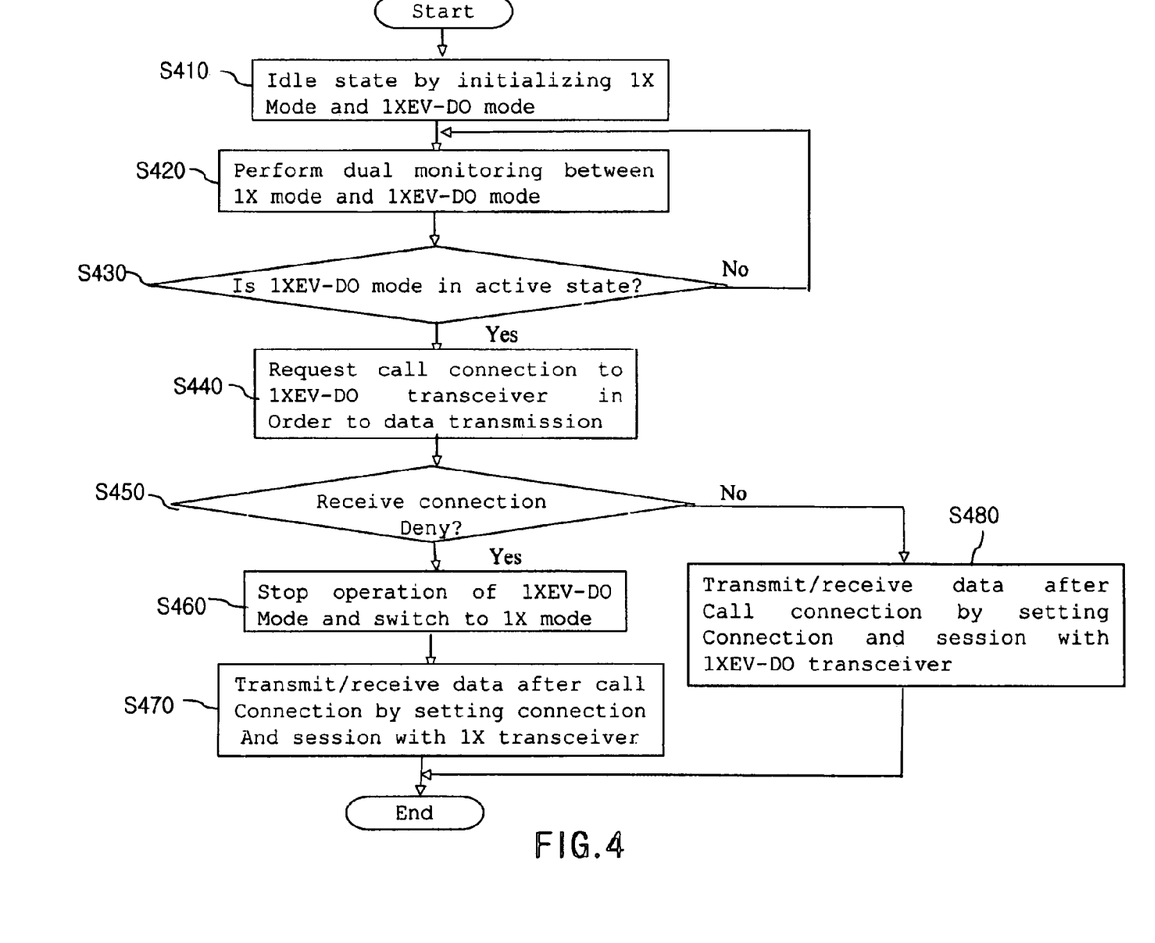
FIG. 4 is a flowchart showing a method for switching over a call connection to a 1X system when the 1xEV-DO system malfunctions.

FIG. 4 is a flowchart showing a method for switching over a call connection to a 1X system when the 1xEV-DO system malfunctions.

First, when the hybrid access terminal 110 is powered on by a user, the hybrid access terminal 110 receives the pilot signals from the 1X controller 132 and the 1X transceiver 122 of the 1X system so that the 1X mode is initialized and the hybrid access terminal 110 is maintained in an idle state. In addition, the hybrid access terminal 110 initializes the 1xEV-DO mode by using a system parameter message obtained when initializing the 1X mode, and the pilot signals transmitted from the 1xEV-DO access network controller 134 and the 1xEV-DO access network transceiver subsystem 124, and then, the hybrid access terminal 110 is maintained in the idle state (S410).

In the idle state, the hybrid access terminal 110 is basically set at the 1X mode for an operation of the hybrid access terminal 110, and waits for communication.

After initializing the 1X mode and the 1xEV-DO mode, the hybrid access terminal 110 is set to the 1X mode and performs a dual monitoring between the 1X mode and the 1xEV-DO mode. At this time, the hybrid access terminal 110 monitors the 1xEV-DO mode at a time period of 5.12 seconds in the 1X mode state (S420).

Herein, the dual monitoring means that the hybrid access terminal 110 basically performs an operation of monitoring whether or not data are received from the 1X transceiver 122 or whether or not data are transmitted to the 1X transceiver 122 in the 1X mode state, performs an operation of monitoring whether or not data are transmitted from the 1xEV-DO access network transceiver subsystem 124 by switching an operation mode of the hybrid access terminal 110 to the 1xEV-DO mode after a period of 5.12 seconds, and then returns to the 1X mode.

Meanwhile, when a user wants the hybrid access terminal 110 to receive multimedia data from the 1xEV-DO system, the user sets the hybrid access terminal 110 to the 1xEV-DO mode by adjusting the hybrid access terminal 110, so that the 1xEV-DO mode of the hybrid access terminal 110 is in an active state allowing data to be received in the 1xEV-DO mode. In addition, when multimedia data are one-sidedly transmitted from the 1xEV-DO access network transceiver subsystem 124 to the hybrid access terminal 110, the hybrid access terminal 110 have to receive the multimedia data in a state switched from the 1X mode to the 1xEV-DO mode, so that the 1xEV-DO mode changes into the active state for receiving the multimedia data (S430).

When the 1xEV-DO mode of the hybrid access terminal 110 becomes the active state, the hybrid access terminal 110 has to form a connection and a session with the 1xEV-DO access network transceiver subsystem 124 so as to enable multimedia data to be transmitted/received from/to the 1xEV-DO access network transceiver subsystem 124. Therefore, the hybrid access terminal 110 transmits a connection request message to the 1xEV-DO access network transceiver subsystem 124 in order to form a connection for receiving data from the 1xEV-DO access network transceiver subsystem 124, and request a call connection (S440).

Herein, the connection is a logical communication path. In communication, the connection means a communication path set for information transmission between a terminal and a system. Also, The session means a period from when a terminal and a system recognize each other through a message change for the purpose of communicating between the terminal and the system until the communication is ended.

Meanwhile, when receiving a connection request message from the hybrid access terminal 110 through the 1xEV-DO access network transceiver subsystem 124, that is, when receiving request of a call connection, the 1xEV-DO access network controller 134 examines whether or not a malfunction occurs in any one from among all resources of the base station transceiver subsystem, all resources of the base station controller, and all resources of the PDSN. If judging that a system malfunction occurs in the 1xEV-DO access network transceiver subsystem 124 or the 1xEV-DO access network controller 134, the 1xEV-DO access network controller 134 transmits a connection deny message to the hybrid access terminal 110. Herein, the system malfunction signifies a state in which the base station cannot assign a frequency signal, which must be assigned for setting a plurality of channels including a pilot channel, to the hybrid access terminal 110 requesting a call connection over a predetermined period of time. Also, the system malfunction may be created when an error is generated in system parameters, such as signal intensity and the like.

When receiving the connection deny message from the 1xEV-DO access network controller 134 through the 1xEV-DO access network transceiver subsystem 124 (S450), the hybrid access terminal 110 stops an operation of the 1xEV-DO mode, which is in the active state, and is automatically switched to the 1X mode, thereby activating the 1X mode to an active state (S460).

Subsequently, the hybrid access terminal 110 performs a call connection to the 1X system by using the 1X mode which is in the active state. After a call connection is achieved, the hybrid access terminal 110 transmits/receives data to/from the 1X system including the 1X controller 132, the 1X transceiver 122, and the mobile switching center 140 (S470).

Meanwhile, in step S450 of judging whether or not the connection deny message is received from the 1xEV-DO access network controller 134 through the 1xEV-DO access network. transceiver subsystem 124, if receiving a connection acknowledgment message from the 1xEV-DO access network transceiver subsystem 124 owing to a normal operation of the 1xEV-DO system, the hybrid access terminal 110 forms a connection and a session with the 1xEV-DO access network transceiver subsystem 124, thereby completing a call connection process and then performing a process of transmitting/receiving data (S480).

That is, after the connection is formed between the hybrid access terminal 110 and the 1xEV-DO access network transceiver subsystem 124, the session is set. To be more specific, the hybrid access terminal 110 requests a UATI (Unicast Access Terminal Identifier) to the 1xEV-DO access network controller 134 through the 1xEV-DO access network transceiver subsystem 124, and then the 1xEV-DO access network controller 134 assigns a UATI to the hybrid access terminal 110, so that a session is set. Herein, the UATI, which is an ID of a terminal, means the number assigned to the hybrid access terminal 110 by the access network. When the session is set between the hybrid access terminal 110 and the 1xEV-DO access network transceiver subsystem 124, parameters used for handoff, power control, setup of a 1xEV-DO data call are set.

After a session is formed between the hybrid access terminal 110 and the 1xEV-DO system, the 1xEV-DO access network controller 134 provides packet data, which are received from the IP network 160 through the PDSN 150, to the hybrid access terminal 110 through the 1xEV-DO access network transceiver subsystem 124 in wireless manner.

According to the method and the system of the present invention, when the hybrid access terminal (HAT) requests a call connection to the 1xEV-DO system, if a malfunction occurs in the 1xEV-DO system, a call connection is switched to the 1X system, so that a call connection may be realized.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

Industrial Application

As can be seen from the foregoing, according to the present invention, although a malfunction occurs in the CDMA 2000 1xEV-DO system when the mobile terminal performs a call connection to the CDMA 2000 1xEV-DO system in order to receive a multimedia service, the call connection is switched to the CDMA 2000 1X system, so that it is prevented to retry the call connection several times, and an immediate service can be provided to a user.

In addition, while the CDMA 2000 1xEV-DO system, in which a malfunction has been caused, is recovering, a user can constantly receive a multimedia data service through the CDMA 2000 1X system.

What is claimed:

1. A hybrid mobile communication system for switching a call connection to a CDMA 2000 1X system when a malfunction occurs in a CDMA 2000 1xEV-DO system, the hybrid mobile communication system comprising:

a hybrid access terminal operated in a 1X mode in relation to a 1X system for receiving a voice signal transmission service or a low-rate data transmission service from the 1X system and in a 1xEV-DO mode in relation to the 1xEV-DO system for receiving a high-rate data transmission service from the 1xEV-DO system, in which the hybrid access terminal trying a call connection to the 1xEV-DO mode in order to receive the high-rate data transmission service is switched to the 1X mode when receiving a connection deny message from the 1xEV-DO system, thereby carrying out the call connection to the 1X system and receiving the high-rate data transmission service through the 1X system;

a 1xEV-DO access network transceiver subsystem for providing the high-rate data transmission service to the hybrid access terminal through an air interface;

a 1X transceiver for providing the voice signal transmission service or the low-rate data transmission service to the hybrid access terminal;

a 1xEV-DO access network controller for controlling the high-rate data transmission service of the 1xEV-DO access network transceiver subsystem;

a 1X controller for controlling the voice signal transmission service or the low-rate data transmission service of the 1X transceiver;

a mobile switching center for providing a communication access path by switching to the 1X system in response to a communication call transmitted from the hybrid access terminal; and a packet data serving node (PDSN) for transmitting/receiving high-rate data to/from the 1xEV-DO system in a form of an internet protocol (IP) packet.

2. The hybrid mobile communication system as claimed in claim 1, wherein the hybrid access terminal is set to the 1X mode in an idle state thereof in order to make communication with the 1X system and is periodically switched to the 1xEV-DO mode at a predetermined period of time so as to check whether or not data are received through the 1xEV-DO system and returns to the 1X mode.

3. The hybrid mobile communication system as claimed in claim 1, wherein the hybrid access terminal receiving high-rate data from the 1xEV-DO system in the 1xEV-DO mode is periodically switched to the 1X mode at a predetermined period of time so as to check whether or not voice signals are received through the 1X system and returns to the 1xEV-DO mode.

4. The hybrid mobile communication system as claimed in claim 1, wherein a TDMA (time division multiple access) method is utilized in a case of a forward link transmitting data from the 1xEV-DO system to the hybrid access terminal, and a CDMA (code division multiple access) method is utilized in a case of a reverse link transmitting data from the hybrid access terminal to the 1xEV-DO system.

5. The hybrid mobile communication system as claimed in claim 4, wherein a hard handoff is carried out in case of the forward link, through which data are transmitted from the 1xEV-DO system to the hybrid access terminal, by transmitting data with maximum power without performing power control, and a soft handoff is carried out in case of the reverse link while performing the power control with respect to each hybrid access terminal.

6. The hybrid mobile communication system as claimed in claim 1, wherein the hybrid access terminal switches from the 1xEV-DO mode into the 1X mode by tracking the frequency of the 1X system using a searcher module under the control of a mobile station modem (MSM) chip.

7. The hybrid mobile communication system as claimed in claim 5, wherein the forward link includes a pilot channel used for transmitting a pilot signal allowing the 1xEV-DO system to track the hybrid access terminal, a MAC (medium access control) channel used for controlling the reverse link, a control channel used for transmitting a broadcast message or a direct message for directly controlling a specific hybrid access terminal from the 1xEV-DO system to the hybrid access terminal, and a traffic channel used for transmitting only packet data from the 1xEV-DO system to the hybrid access terminal.

8. The hybrid mobile communication system as claimed in claim 1, wherein, in order to maximize a throughput in each sector and allot high-rate transmission to each user as possible depending on channel conditions, the 1xEV-DO system provides a high-rate data transmission service with a maximum power when transmitting the high-rate data to the hybrid access terminal in one sector.

9. The hybrid mobile communication system as claimed in claim 7, wherein the pilot channel is used as a reference for coherent detection of the wireless base station having the 1xEV-DO system by means of the hybrid access terminal.

10. The hybrid mobile communication system as claimed in claim 7, wherein the hybrid access terminal receives at least one pilot signal through the pilot channel and accesses to a wireless base station, which has transmitted a pilot signal having greatest intensity.

11. A method for switching a call connection to a CDMA 2000 1X system when a malfunction occurs in a CDMA 2000 1xEV-DO system, the method comprising the steps of:

(a) initializing a 1X mode for making communication with the 1X system and a 1xEV-DO mode for making communication with the 1xEV-DO system and staying in an idle state;

(b) performing dual monitoring with respect to the 1X mode and the 1xEV-DO mode;

(c) causing the 1xEV-DO mode to enter an active state so as to transmit/receive multimedia data;

(d) transmitting a connection request message to the 1xEV-DO system, thereby an access terminal requesting a call connection;

(e) judging whether or not a connection deny message is received by the access terminal from the 1xEV-DO system;

(f) stopping an operation of the 1xEV-DO system when the connection deny message is received, and causing the 1X mode to enter an active state by switching hybrid access terminal into the 1X mode; and (g) transmitting/receiving data by carrying out the call connection with the 1X system.

12. The method as claimed in claim 11, wherein, in step (e), when not receiving the connection deny message but receiving a connection acknowledgment message from the 1xEV-DO system, the hybrid access terminal carries out the call connection by forming a connection and a session with the 1xEV-DO system, and then performing a process of transmitting/receiving high-rate data.

13. The method as claimed in claim 11, wherein, in step (a), in the idle state, the hybrid access terminal is set to the 1X mode so as to make communication with the 1X system, is periodically switched to a 1xEV-DO mode at a predetermined period of time so as to check whether or not high-rate data are received from the 1xEV-DO system, and returns to the 1X mode.

14. The method as claimed in claim 11, wherein, in step (b), while receiving high-rate data in the 1xEV-DO mode, the hybrid access terminal is periodically switched to the 1X mode at a predetermined period of time so as to check whether or not a voice signal is received through the 1X system and returns to the 1xEV-DO mode.

15. The method as claimed in claim 12, wherein the session is set by requesting a UATI (Unicast Access Terminal Identifier) to the 1xEV-DO system and receiving the UATI from the 1xEV-DO system, the UATI is an TD of the hybrid access terminal, which represents a number assigned to the hybrid access terminal from the 1xEV-DO system, and parameters used for handoff, power control, setup of a high-rate data call are set when the session is set between the hybrid access terminal and the 1xEV-DO system.

16. The method as claimed in claim 11, wherein a TDMA (time division multiple access) method is utilized in a case of a forward link transmitting data from the 1xEV-DO system to the hybrid access terminal, and a CDMA (code division multiple access) method is utilized in a case of a reverse link transmitting data from the hybrid access terminal to the 1xEV-DO system.

17. The method as claimed in claim 16, wherein the forward link includes a pilot channel used for transmitting a pilot signal allowing the 1xEV-DO system to track the hybrid access terminal, a MAC (medium access control) channel used for controlling the reverse link, a control channel used for transmitting a broadcast message or a direct message for directly controlling a specific hybrid access terminal from the 1xEV-DO system to the hybrid access terminal, and a traffic channel used for transmitting only packet data from the 1xEV-DO system to the hybrid access terminal.

18. The method as claimed in claim 17, wherein the pilot channel is used as a reference for coherent detection of the wireless base station having the 1xEV-DO system by means of the hybrid access terminal.

19. The method as claimed in claim 17, wherein the hybrid access terminal receives at least one pilot signal through the pilot channel and accesses to a wireless base station, which has transmitted a pilot signal having greatest signal intensity.

20. The method as claimed in claim 14, wherein switching from the 1xEV-DO mode to the 1X mode is carried out by tracking the frequency of the 1X system using a searcher module under the control of a mobile station modem (MSM) chip.

21. A hybrid access terminal for switching a call connection to a CDMA 2000 1X system when a malfunction occurs in a CDMA 2000 1xEV-DO system, wherein, the hybrid access terminal is operated in a 1X mode in relation to a 1X system for receiving a voice signal transmission service or a low-rate data transmission service from the 1X system and in a 1xEV-DO mode in relation to the 1xEV-DO system for receiving a high-rate data transmission service from the 1xEV-DO system, and the hybrid access terminal trying a call connection to the 1xEV-DO mode in order to receive the high-rate data transmission service is switched to the 1X mode when receiving a connection deny message from the 1xEV-DO system, thereby carrying out the call connection to the 1X system and receiving the high-rate data transmission service through the 1X system.

22. The hybrid access terminal as claimed in claim 21, wherein the hybrid access terminal is set to the 1X mode in an idle state thereof in order to make communication with the 1X system and is periodically switched to the 1xEV-DO mode at a predetermined period of time so as to check whether or not data are received through the 1xEV-DO system and returns to the 1X mode.

23. The hybrid access terminal as claimed in claim 21, wherein the hybrid access terminal receiving high-rate data from the 1xEV-DO system in the 1xEV-DO mode is periodically switched to the 1X mode at a predetermined period of time so as to check whether or not voice signals are received through the 1X system and returns to the 1xEV-DO mode.

24. The hybrid access terminal as claimed in claim 21, wherein a TDMA (time division multiple access) method is utilized in a case of a forward link transmitting data from the 1xEV-DO system to the hybrid access terminal, and a CDMA (code division multiple access) method is utilized in a case of a reverse link transmitting data from the hybrid access terminal to the 1xEV-DO system.

25. The hybrid access terminal as claimed in claim 21, wherein the hybrid access terminal switches from the 1xEV-DO mode into the 1X mode by tracking the frequency of the 1X system using a searcher module under the control of a mobile station modem (MSM) chip.

* * * * *